E. SCHMITT.
OUTGAUGE.
APPLICATION FILED APR. 1, 1920.
1,423,156. Patented July 18, 1922.
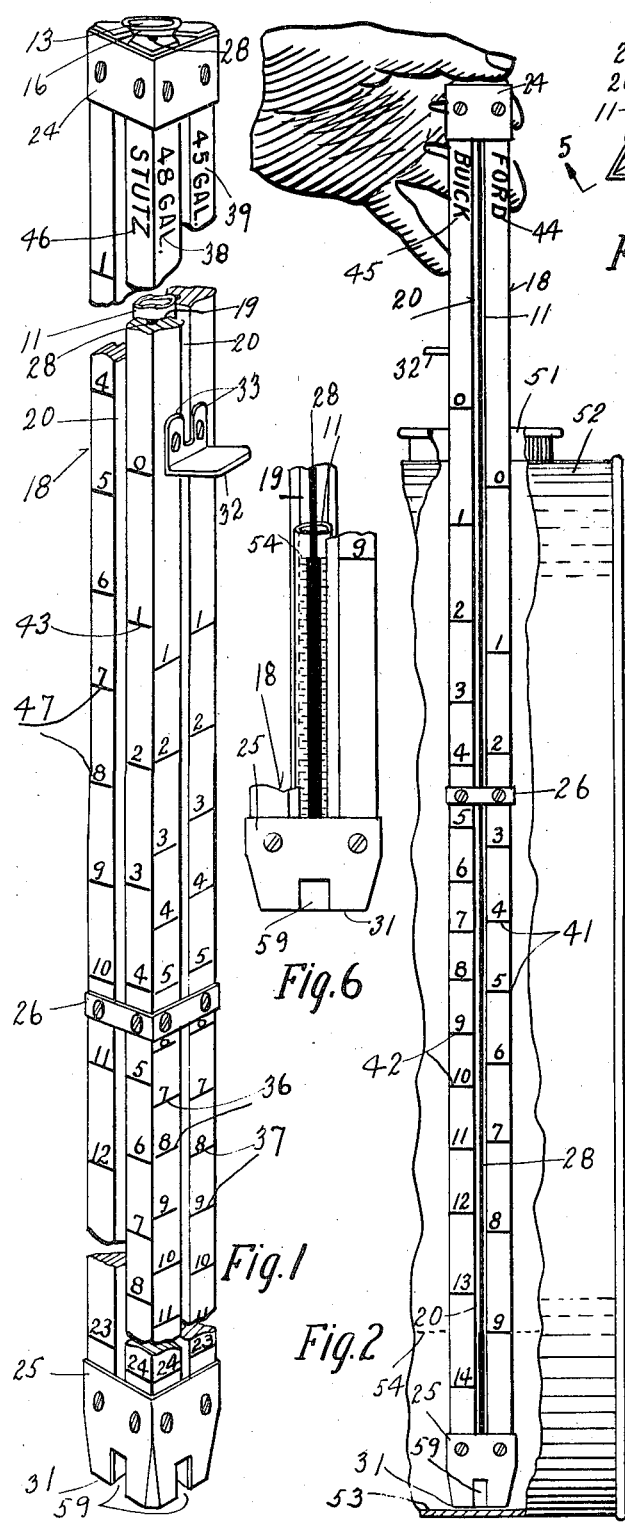
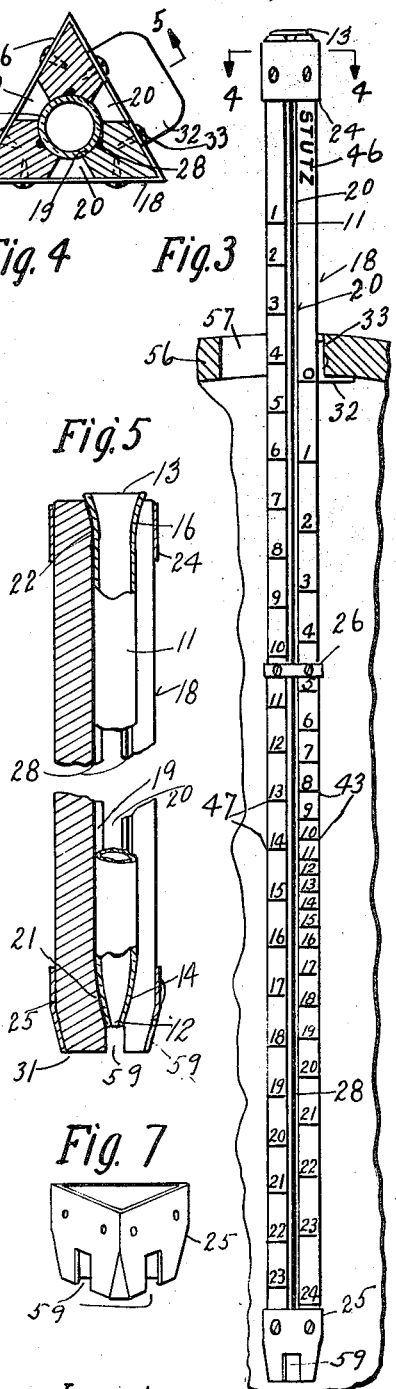
Inventor:
Eugene Schmitt,
by his Attorney.

UNITED STATES PATENT OFFICE.

EUGENE SCHMITT, OF CINCINNATI, OHIO.

OUTGAUGE.

1,423,156.  Specification of Letters Patent.  Patented July 18, 1922.

Application filed April 1, 1920. Serial No. 370,518.

*To all whom it may concern:*

Be it known that I, EUGENE SCHMITT, a citizen of the United States, residing at Cincinnati, in the county of Hamilton and State of Ohio, have invented certain new and useful Improvements in Outgauges, of which the following is a specification.

It is the object of my invention to provide a new and improved device whereby to conveniently and accurately measure without calculation the quantity of liquid which is lacking to fill a container to standard or desired extent, and to indicate the quantity of liquid which it is necessary to supply in the container in order to fill the same.

My invention is applicable in measuring the quantity of gasolene required to fill the gasolene tanks of automobiles, or to indicate the shortage in barrels containing liquid commodities, such as vinegar, alcohol, or other liquids.

It is the object of my invention further to provide a measuring tube with means which are emphasized by the presence of the liquid in the tube to readily indicate the presence and height of the liquid in the tube; further, to provide an outgauge of the character mentioned with a plurality of contacts to form the points from which the calculations for outage in the container are made; and, further, to provide an outgauge with a plurality of graduations respectively extending between said contacts and extending to both sides of one of said contacts lengthwise of the tube.

The invention will be further readily understood from the following description and claims, and from the drawing, in which latter:

Fig. 1 is a perspective view of an outgauge partly broken away, showing my invention.

Fig. 2 is a side elevation of my improved device partly broken away, showing its employment in measuring the outgauge in a gasolene tank of an automobile, the tank being partly broken away.

Fig. 3 is a side elevation of my improved device showing its employment in measuring the outage in a barrel by employment of its upper contact.

Fig. 4 is a cross-section of my improved device taken on the line 4—4 of Fig. 3.

Fig. 5 is a longitudinal axial section of my improved device taken in the plane of the line 5—5 of Fig. 4, and partly broken away.

Fig. 6 is a detail in side elevation showing the measuring tube and its support, partly broken away, and indicating the level of liquid in the tube emphasizing the indicating mark to show the presence and height of the liquid; and, Fig. 7 is a perspective view of the lower ferrule of my improved device.

My improved outgauge comprises a tube 11, which is preferably transparent and made of glass. Its lower end is provided with an opening 12, and its upper end with an opening 13. The lower end preferably tapers, as shown at 14, toward the opening 12, in order to constrict the opening and make it of smaller cross-section than the cross-section of the tube proper, whereby to readily retain the liquid in the tube when the upper opening is closed. The upper end of the tube preferably is tapered outwardly, as shown at 16, for enlarging the upper opening, so that its cross-section is of greater area than the cross-section of the tube proper.

The tube is provided with a support, exemplified at 18, the support having a groove 19 extending lengthwise thereof for receiving the tube. I have shown three of these supports as members of an integral support arranged about the tube, and having lengthwise spaces between them, forming viewing slots 20, so that the tube may be viewed through these spaces to expose the liquid and the height of liquid in the tube.

The lower end of the support is provided with an inwardly extending seat 21, which coacts with the lower tapering end of the tube, and the upper end of the tube is provided with an outwardly extending seat 22 which coacts with the upper spreading end of the tube. The seats position the tube lengthwise. The members of the support are preferably connected, the connections being shown as consisting of an upper band 24, a lower ferrule 25, and an intermediate band 26, suitably secured to the members of the support, as by screws.

Means are provided which are arranged to be emphasized or magnified by the liquid in the tube. I have shown these means as comprising a mark 28, extending lengthwise of the tube, and so arranged that the mark may be viewed through the tube. This mark is preferably of different color from the color of the portion of the support seen through the tube, being for instance a black line in the lighter backing face of the tube. In the present exemplification there is one of these marks or lines opposite each of the viewing slots in the support, so that one of the marks or lines may be viewed through each of these viewing slots.

In measuring the outage of gasolene in gasolene tanks for automobiles, I employ the bottom 31 of the gage as a contact or stop to form a point from which graduations on the gage are calculated. When employing the gage for measuring the outages, for instance, in barrels containing vinegar or other liquids, I employ an upper stop arranged to contact the inner edge of the wall of the bung-hole of the barrel. I have exemplified this latter stop in the form of a shelf 32, suitably secured to the support, as by providing the same with flanges 33, by means of which the stop is secured to the support by suitable screws.

Graduations may be provided at each side of the viewing slot of the support. Thus, as an illustration, graduations 36, 37, may be at the respective sides of the slot at which the shelf 32 is located, which graduations are applicable respectively for instance to a 48 gallon barrel and a 45 gallon barrel, and indications for which respectively are shown at 38, 39. The graduations for measuring these barrels are entirely below the shelf, and the gage is made of sufficient length below the shelf to extend to desirable extent into the barrel, such extent being in practice a distance equal to about one-half the diameter of the barrel, but the gage may be made to extend deeper into the barrel if desired.

The gage may also be provided with graduations for the tanks of various standard automobiles, such graduations being shown at 41, 42, 43, the automobiles to which these graduations relate being indicated at 44, 45, 46. The graduations 41, 42 and 43 are shown as entirely below the upper stop 32. An additional graduation 47 may be provided which extends the full length of the gage above and below the upper stop. The portion of the outgauge above the upper stop may be of such length as is desired and is necessary to accommodate the full length of any gage for any container, the liquid contents of which it is desired to measure.

When measuring the outage in a container, by employment of the lower stop, the gage is inserted for instance through the pouring opening 51 in the container, shown as an automobile tank 52, the gage being inserted so that its lower end or stop rests on the bottom 53 of the tank. The level of the gasolene instanced in the tank is indicated at 54. When so employing the device the upper stop may be outside of the tank.

When using the graduations calculated from the upper stop, the gage is inserted into the barrel 56 through the bung-hole 57, and its upper stop is brought firmly against the inner end of the bung-hole.

In each case the gage is held upright when in either of these positions. The upper opening in the tube being allowed to remain open until the tube has been positioned in the container, the liquid in the container will flow into the tube through the lower opening in the tube, until the liquid therein is at the same level as in the container. In order to facilitate the flow of the liquid into the tube when the lower stop is employed, the lower end of the tube terminates slightly above the lower end of the support, so as to provide space between the bottom of the tube and the bottom of the container, through which the liquid may flow into the tube. The lower end of the ferrule is preferably provided with slots 59 which register with the viewing slots 20 in the support for the purpose stated.

When the liquid has flowed into the tube so as to be at the same level therein as in the container, the user places his thumb across the upper opening in the tube, so as to close said opening, and thereby sustain the weight of the column of liquid in the tube, by means of the imprisoned air between the upper end of the column of liquid and the closed upper opening of the tube. This is aided by the constricting of the opening at the bottom portion of the tube. The gage is then removed from the container, and the reading of the outage in the container upon the proper graduation to correspond with the container is then had. These graduations begin at a higher point in the gage and increase in value downwardly.

Thus, assuming that the container 52 is for the graduation 41, and reading the gage on graduation 41 when the gage has been removed from the container, the liquid will be in the tube to the level of the graduation numeral 9, to show that there is an outage of 9 gallons in the tank, and that it will take 9 gallons of gasolene to fill the tank.

The column of liquid in the tube may be returned to the container by placing the lower end of the container in the opening of the tank and removing the thumb, whereby the column of liquid in the tube will flow into the container.

After the container has been filled, a new test of height may be made to verify the quantity of gasolene which has been placed into the tank, so that the user of the automobile may know that he has received the proper quantity of gasolene for which he has paid.

When testing the outage in a barrel, such as shown in Fig. 3, similar steps are taken, but instead of placing the bottom of the gage against the bottom of the barrel, the upper stop is employed against the inner end of the bung hole.

The reading is taken through one of the viewing slots of the support. The lower end of the emphasizing mark opposite said viewing slot is emphasized up to the level of the liquid in the tube, due to the magnifying effect of the liquid and tube, so as to readily indicate the height of the liquid in the tube. For instance, when a black line is employed against a light back-ground, the black line will throughout the height of the liquid show wider than the black line above the liquid, thus readily indicating the height of the liquid in the tube.

My improved device is simple in construction and use, and may be used repeatedly in quick successions, with assurance of accuracy in results.

Having thus fully described my invention, what I claim as new and desire to secure by Letters Patent is:

1. In an outgauge, the combination of a transparent tube having an opening in its lower portion and an opening in its upper portion, a support surrounding said tube and having viewing slots extending lengthwise of said tube at the respective sides of said support through which said tube is viewed, graduations at the respective sides of said respective slots, said support provided with walls respectively directly in rear of said respective slots, and emphasizing marks extending lengthwise on said respective walls in rear of said tube opposite said respective viewing slots, the liquid in said tube magnifying said respective emphasizing marks.

2. In an outgauge, the combination of a transparent tube having a taperingly contracting bottom end and the wall of the upper end of which flares taperingly outward, and a support for said tube comprising a bore in which said tube is received, the wall of the lower end of said bore taperingly contracting toward the axis of said bore for complemental relation with the lower taperingly contracting end of said tube, the wall of the upper end of said bore flaring taperingly outward to conform and be complemental to said taperingly flaring upper end of said tube, said lower end of said tube spaced upwardly from the lower end of said support, and the lower end of said support provided with laterally extending slots connecting the outer wall of said support with said bore.

In testimony whereof, I have hereunto signed my name in the presence of two subscribing witnesses.

EUGENE SCHMITT.

In presence of—
 DELMA WERNSING,
 JAMES J. FITZPATRICK.